Figure 1:
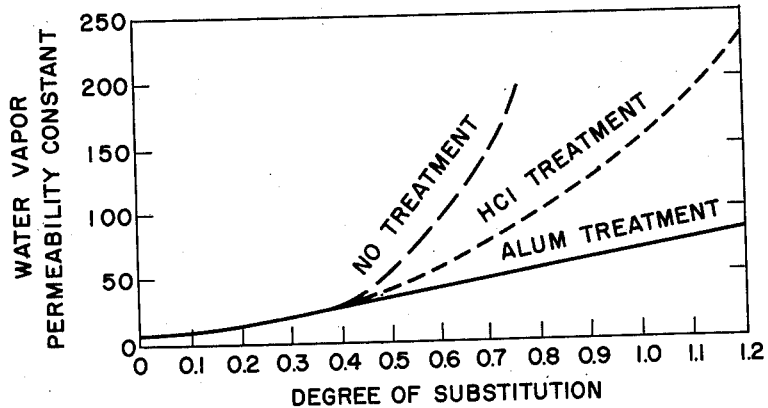
Figure 2:
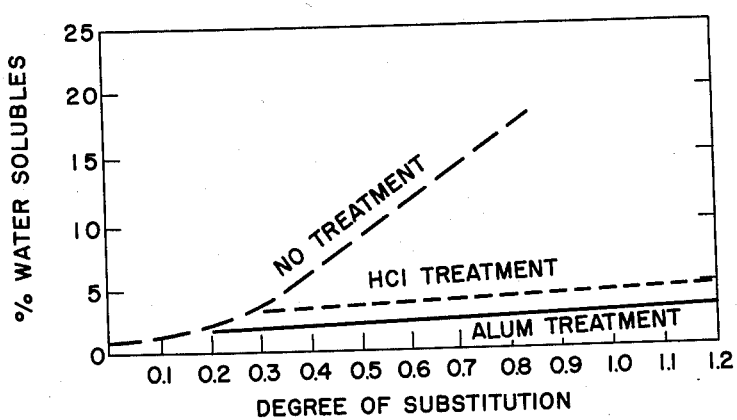

3,081,270
WATERPROOF PLASTIC FILMS OF INCREASED WATER VAPOR PERMEABILITY AND METHOD OF MAKING THEM

John T. Howarth, Reading, and Joseph Shulman, Dorchester, Mass., assignors to Arthur D. Little, Inc., Cambridge, Mass., a corporation of Massachusetts
Filed June 21, 1960, Ser. No. 37,623
15 Claims. (Cl. 260—17)

This invention relates to a method for increasing the water vapor permeability of waterproof plastic films, and to the films so prepared.

There is extensive and increasing demand for films which prevent the passage of liquid water (i.e. which are waterproof) but which permit the passage of water vapor (i.e. which "breathe"). A typical use for such films is in clothing, particularly in garments such as rainwear, which though intended primarily to protect the wearer against the elements, nevertheless should have moderate water vapor permeability in order that they may be worn comfortably. In other words, these garments "breathe," and so release the uncomfortable humidity which would otherwise build up inside the garment due to perspiration or transpiration of the wearer. Other uses for such films are as shoe uppers, bandages, and domestic and industrial upholstery (e.g. for automobiles and boats), wherein lack of water vapor permeability results in discomfort to the user because of the above-mentioned humidity build-up.

Waterproof plastic films adequately permeable to water vapor are already known. Such films may be inherently so permeable, or they may have been made so by suitable treatment. However, these permeable films suffer from one or another disadvantage such as low strength or tear resistance, ease of soiling, difficulty in cleaning, poor appearance or relatively high cost.

Known methods of making normally non-permeable plastic films permeable to water vapor, while remaining waterproof, involve the incorporation of water-soluble agents which are intimately mixed with the plastic prior to sheeting, and then washed out of the finished sheet to provide a spongy or porous product; or the perforation of the finished sheet with many minute holes throughout its area. The use of water-soluble agents that are washed out to leave a porous structure, e.g., various water-soluble inorganic salts which are dispersed throughout the plastic in the form of particles or crystals and which are insoluble therein, results in a very weak and easily ruptured product. This product is also readily soiled because of the holes which give it its water vapor permeability. The perforated sheet suffers from the same disadvantages.

It is accordingly an object of this invention to prepare waterproof plastic films having improved water vapor permeability.

Another object is to prepare such films which are relatively strong and have good tear and abrasion resistance, which do not soil readily, and which can be cleaned with relative ease.

Still another object is to prepare such films which retain their vapor permeability properties without substantial change throughout their useful life.

A further object is to prepare such films which are relatively inexpensive and do not require a significant amount of special apparatus for their manufacture.

Other objects willl appear from the disclosure which follows.

Contrary to what would be expected from the experience of prior workers in this field, we have found that we are able to attain a desired and controlled degree of water vapor permeability in normally vapor-impermeable waterproof plastic films by incorporating in specified proportions, with the plastic composition from which such films are formed, a water-sensitive compound which has a composition, particle size, and other properties and characteristics as hereinafter set forth, and which, though water-sensitive, is substantially water-insoluble in its association in the final film. By suitable selection of the water-sensitive compound within the prescribed ranges of properties, and in desired proportions, the final plastic film may have, and retain throughout its useful life, a water vapor permeability of as high as 10 to 15 times that of the untreated film without, however, encountering the drawbacks of lack of strength, ease of soiling, poor appearance, solubility, etc. which have plagued the prior art processes.

Any water-insoluble film-forming plastic material which is normally substantially impervious to water vapor transmission may be treated according to this invention. Such materials include polyvinyl chloride, polyethylene, polyurethane, polypropylene, nylon, polytetrafluoroethylene, polyvinylidene chloride, copolymers such as butadiene-styrene and butadiene-acrylonitrile, and natural rubber. These plastic materials are characterized by having a low water vapor permeability constant, as determined by ASTM method E–96–53T. That method expresses the permeability in terms of grams of water vapor passed through the film per 100 square inches of film area per mil thickness per 24 hours, at 100° F. and 90% R.H. In relatively thin films of the type herein referred to, the permeability is inversely proportional to the film thickness.

The low permeability constant referred to above is of course different for different plastic materials of the class above mentioned. Thus, in the cases of polyvinyl chloride and natural rubber, for example, it ranges around 12 to 20; in the case of polyvinylidene chloride, less than about 3; and in the case of polyethylene, less than one.

Reference has already been made herein to the fact that the plastic films of this invention may have as much as 10 to 15 times the water vapor permeability of the same films untreated. Thus, a film of polyvinyl chloride and a film of polyethylene may be prepared in identical fashion in accordance with this invention, and have water vapor permeability constants of 200 and 12 respectively. Nevertheless, this represents a larger proportional increase in permeability constant for the polyethylene than it does for the polyvinyl chloride, and opens new uses for the former just as it does for the latter.

The water-sensitive material incorporated with the plastic material becomes more effective as its ability to absorb water increases, and yet it must be sufficiently water-insoluble that the final film will not lose more than 5% in weight, by dissolving out of the water-sensitive material, upon soaking the film in water. Excessive absorptivity results in weakening of the film. Greater solubility in water results in gradual washing away of the incorporated material. To be sure, some of the material washes or dissolves out even at the specified low solubility, but such washing out is little enough so that the product film lasts its expected life in normal use before washing out becomes at all significant.

The water-sensitive material is in discrete solid particle form. The particles are of such a size that they provide direct contact from one face of the film to the other through single particles, or through a series of particles in direct contact with each other from face to face of the film. Preferably, the major portion of the particles are of sufficient size to extend through the film from face to face. In order to accomplish these objectives we select the particles, as by screening, of a size close to that of the final film to be prepared, and preferably somewhat larger in size. For best results, the particles in any given formulation will extend over a size range of 50% to 150% of the thickness of the sheet to be prepared, and preferably a size range of about 75% to 125% of such thickness. Particles which are of greater diameter than the film thickness are, of course, reduced in size or otherwise rearranged or oriented so that they do not project significantly beyond the film surfaces. If the particles are too large, the film has a mottled appearance and tends to be weak. If the particles are too small, the vapor transmission becomes poor, for reasons set forth below. As a practical matter, particles ranging in size between about 70 and 150 microns are most suitable for films ranging in thickness between about 3 mils and 6 mils. The larger particles are preferable for the thicker films, and the smaller particles for the thinner films. The films with which this invention is concerned are in the general thickness range of one to 10–15 mils.

It should be understood that the films of this invention may be constructed with integral reinforcing ribs considerably thicker than the principal portion of the film, i.e. that portion responsible for substantially all of the vapor transmission. When reference is made to film thickness, the principal portion of the film, and not the ribs, is meant, unless the text directs otherwise. This principal portion of the film will generally occupy at least one-half the total area of the film, in order to provide an effective product.

The water-sensitive material must also be insoluble in the water-insoluble plastic material, but miscible therewith to form a homogeneous film.

The amount of water-sensitive material incorporated with the plastic material ranges between about 20 and 50% of the plastic material, by weight. Lesser amounts of the water-sensitive material result in inadequate water vapor permeability; larger amounts excessively reduce the tensile strength of the finished film. The particles of water-sensitive material in the final film, when present in an amount and size within the ranges specified, preferably extend across the film from face to face, or they provide particle-to-particle contact across and throughout the film, or so nearly provide such contact that the amount of film between particles is so small that its resistance to vapor transmission is greatly reduced. Inasmuch as the permeability of the film alone is inversely proportional to its thickness, the amount of film between most of the adjacent particles is thin enough that its permeability to water vapor is fairly substantial. In any event, a substantial proportion of the particles should be of sufficient size to extend across the films from face to face. The plastic material thus forms the continuous phase of the film, and the water-sensitive material forms the discontinuous phase, being uniformly dispersed throughout the continuous phase, but in sufficient amount to be at least in point-to-point contact, or substantially so, from particle to particle in all directions throughout the film.

The water-sensitive material which is particularly useful for the purposes of the present invention is partially substituted sodium carboxymethyl cellulose having the characteristics set forth above. Sodium carboxymethyl cellulose is produced by reacting alkali cellulose with sodium monochloroacetate, whereby the latter reacts with reactive hydroxyl groups in the cellulose molecule thereby introducing sodium carboxymethyl groups into the latter. Theoretically, complete reaction would introduce three such groups into each anhydroglucose ($C_6H_{10}O_5$) unit of the cellulose molecule, and the product would have a substitution of 3.0. Any desired degree of substitution from 3.0 down to vanishingly small degrees may be produced, but for the purposes of this invention, any degree of substitution less than 0.4 is not effective to give the desired permeability of the final film, while degrees of substitution above about 1.2 result in excessive solubility of the water-sensitive material, as well as being difficult to prepare.

The sodium carboxymethyl cellulose of the substitution herein required cannot, however, be used satisfactorily for the purposes of this invention without further treatment, due to its relatively high water solubility. We, therefore, treat it with an insolubilizing agent to reduce its water solubility, or more specifically, the water-solubles content of the final film. The resulting insolubilized carboxymethyl cellulose compound itself gels in contact with water, so its water-solubility cannot be separately meaningfully ascertained. The amount of water-solubles in the film, however, which are due to the insolubilized carboxymethyl cellulose compound, can be readily ascertained by usual techniques of soaking the film in water. The insolubilizing treatment consists in replacing either completely or in part the sodium ions on the carboxy groups with hydrogen or with insolubilizing metals. There are a number of metal salts available for such insolubilization, e.g. salts of aluminum, barium, strontium, chromium, silver, iron or lead. Any of these may be used. When the sodium ions are replaced in part, rather than wholly, it is preferable that such replacement be to the extent of at least 50%, but in any event to the extent that the final film produced as herein described shall lose not more than 5% in weight on water soaking as herein described.

The insolubilizing treatment can be carried out either during manufacture of the sodium carboxymethyl cellulose or after it is made. In the former case, the sodium carboxymethyl cellulose, prior to the conventional purifying step of washing in alcohol-water mixtures to remove sodium chloride and sodium glycolate, is treated with strong acid to replace enough of the sodium ions with hydrogen ions so that the thus treated carboxymethyl cellulose product is effectively insolubilized as set forth above. Hydrochloric acid is a preferred embodiment of the strong acid, although other strong acids may be used as long as they do not degrade the carboxymethyl cellulose compounds. A pH of 1 to 2.5 is a good working range; this will depend upon the kind and amount of acid used and the exact extent or degree of insolubilization desired.

After this acid treatment, the product is washed to eliminate salts, and then dried and screened to the desired particle size.

Alternatively, the insolubilizing treatment may be accomplished on sodium carboxymethyl cellulose which has been washed and then dried to powder form. This dried powder is dispersed in a 70–30 alcohol-water mixture, and then treated with the strong acid as described above, washed, and redried.

As already stated, the insolubilizing treatment may be carried out by the use of a metal salt instead of an acid. This, as with the acid, may be done either before or after the step of washing and drying the sodium carboxymethyl cellulose. In this treatment, the sodium carboxymethyl cellulose solution or powder is dispersed in a solution of alum whereupon the aluminum replaces the sodium in whole or in part giving a water-insoluble product that retains water absorptive properties. The washed and dried product when incorporated into plastic film increases the water vapor transmission yet remains relatively insoluble as determined by water soak tests. Characteristics of the material when incorporated into a plastic film at 25% loading are such that the water-solubles (which are principally the insolubilized carboxymethyl cellulose product), on a 24-hour water soak, are no greater than 5%, and are preferably much less, around 1%, yet the water vapor transmission is significantly increased.

Instead of alum, other water-soluble metal salts which are effective to replace in whole or in part the sodium ions with insolubilizing ions can be used, e.g. water-soluble salts of ferrous or ferric iron, chromium, barium, lead, etc.

The accompanying drawings illustrate, in graph form, properties of polyvinyl chloride films made with carboxymethyl cellulose compounds of various types and degrees of substitution and particle sizes. These graphs are schematic in that specific examples may fall somewhat on one side or another of the lines, which are intended to represent average conditions. The "degree of substitution" has already been defined hereinabove. The expression "no treatment" means that the sodium carboxymethyl cellulose has had no insolubilizing treatment. The expressions "HCl treatment" and "alum treatment" indicate the kind of insolubilizing treatment which has been carried out. These curves will shift slightly depending on the extent to which the sodium ions have been replaced by hydrogen or metal, but the shift is relatively insignificant provided that the carboxymethyl cellulose product is indeed insoluble.

Figure 3:
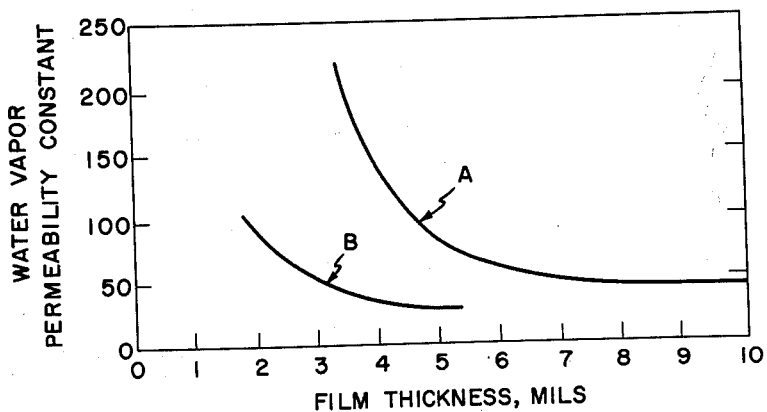

FIG. 3 shows the effect of particle size and film thickness on water vapor permeability. Curve A represents the effect with particles of 100 to 150 microns (4–6 mils) in size, while curve B represents the effect with particles of about 75 microns (3 mils). As clearly evident from the graph, the water vapor permeability constant is not greatly increased by the presence of the carboxymethyl cellulose compound until the size of the latter is fairly comparable to the thickness of the sheet.

The following examples, which are intended to be illustrative rather than limiting, will serve to describe this invention in more detail.

Example I

Commercially available sodium carboxymethyl cellulose Hercules 12HP (Hercules Powder Co., Wilmington, Delaware), at 1.2 substitution was dispersed in a 70–30 methyl alcohol-water solution, and hydrochloric acid was added until the pH was reduced to 1. The solution was then filtered and the residue washed with 70–30 methyl alcohol-water solution until it was free of acid and sodium chloride. The residue was then dried, ground and screened and the product that passed through a 100 mesh screen and that was retained on a 200 mesh screen was used for the following step.

This treated insolubilized carboxymethyl cellulose was then milled into a plasticized polyvinyl chloride resin on a 2-roll mill at 300° F., thoroughly mixed there and then sheeted off. The film was then placed in an oven at 375° F. for 2 minutes to insure complete fusion of the film. Samples of the film were evaluated for water vapor permeability and water solubles with the following results:

Water vapor permeability constant_____ 227
Water solubles (24-hour soak)_____percent__ 4.8

These samples were 3½ to 4 mils in thickness, throughout their area. The films were strong, clear, and waterproof, and met all the requirements herein set forth for a good product in accordance with this invention. Control samples of polyvinyl film showed a permeability constant of 13 and solubles of 1%. The composition of the test samples was as follows.

Material: Percent by weight
Polyvinyl chloride resin (Goodyear Pliovic DB-90V) _____ 49.5
Di-2-ethyl hexyl phthalate (plasticizer)_____ 24.25
Barium cadmium naphthenate soap (stabilizer) _____ 1.0
Insolubilized carboxymethyl cellulose_____ 24.25

Example II

Sodium carboxymethyl cellulose was prepared by treating cellulose fibers with sodium chloroacetic acid to give a substitution of 0.05. The product was thoroughly washed with water, dried and screened. The material that passed a 100 mesh screen and was retained on a 200 mesh screen was then milled into polyvinyl chloride resin in the same proportions and by the same procedure as described in Example I. The results of tests on samples of film of the same thickness (3½–4 mils) gave a permeability constant of 16.2 and water solubles of 1.3. This degree of substitution of the carboxymethyl cellulose is therefore so low as to provide no significant increase in the permeability of the film, and hence is not satisfactory for the purpose of this invention.

Examples III

The procedure, quantities, and conditions of Example I were followed, except that commercially available sodium carboxymethyl cellulose Hercules 7HSP at 0.7 substitution was used in place of the 1.2 substituted material of Example I. This material was acid-treated and then compounded, in the same manner as the 1.2 substituted carboxymethyl cellulose described in Example I. The properties of the filled film, are especially good for the purposes of the present invention; tests show the water vapor permeability constant to be 76 and the water solubles to be less than 1%.

Example IV

Following the teachings of Example III, but without acid treatment of the sodium carboxymethyl cellulose, gives a final film having a permeability constant of 147 and a water solubles of 13.7%. This tendency of the material to leach out during a water soak test shows that failure to insolubilize the sodium carboxymethyl cellulose results in a film having far too high an amount of watersoluble material.

Example V

Carboxymethyl cellulose Hercules 12HP at 1.2 substitution was dispersed in a 5% solution of alum, filtered, washed, dried and screened. Material that passed a 100 mesh screen and that was retained on a 200 mesh screen was compounded into polyvinyl chloride, processed and tested as described in Example I. Test results show an increase in water vapor permeability constant to 76, as compared with a standard polyvinyl chloride film of about 13, while the water solubles on the water soak test are about 3.2%.

Example VI

Commercially available sodium carboxymethyl cellulose Hercules 12HP at 1.2 substitution was acid-insolubilized and treated as set forth in Example I, to provide particles of the size and characteristics there set forth.

This insolubilized product was milled with twice its weight of polyethylene on a 2-roll mill at 250° F., and after thorough mixing was sheeted off in the form of a film about 4 mils in thickness. Samples of this film were evaluated for water vapor permeability, and for water solubles on a 24-hour water soak, with the following results:

Permeability constant_____ 13
Water solubles_____percent__ 0.75

For polyethylene sheets of like thickness, but without the insolubilized carboxymethyl cellulose compound, both the water vapor permeability constant and the water solubles on the 24-hour water soak are zero.

Example VII

Commercially available sodium carboxymethyl cellulose Hercules 12HP at 1.2 substitution was acid-insolubilize and treated as set forth in Example I, to provide particles of the size and characteristics there set forth.

This insolubilized product was milled into a natural rubber and conventional compounding ingredients on a 2-roll mill, thoroughly mixed, and sheeted off and then cured, in the form of a film about 4 mils in thickness. The composition of the sheeted material was as follows (parts are by weight):

| | |
|---|---:|
| Pale crepe | 100 |
| Zinc oxide | 5 |
| Stearic acid | 2 |
| Sulfur | 1.75 |
| Accelerators | 2.5 |
| Antioxidants | 1.5 |
| Softener | 1 |
| Insolubilized carboxymethyl cellulose | 37.5 |
| | 151.25 |

Samples of this film were evaluated for water vapor permeability, and for water solubles on a 24-hour water soak, with the following results:

| | |
|---|---:|
| Permeability constant | 37 |
| Water solubles percent | 1.1 |

For natural rubber films made up the same way and of like thickness, but without the insolubilized carboxymethyl cellulose, the water vapor permeability constant is 20, and the water solubles on the 24-hour water soak are 0.20%.

Example VIII

Commercially available sodium carboxy methyl cellulose Hercules 12HP at 1.2 substitution was acid-insolubilized and treated as set forth in Example I, to provide particles of the characteristics there set forth. The particles were screened to provide a product that passed through a 140 mesh screen and that was retained on a 200 mesh screen.

This insolubilized product of 140–200 mesh was stirred thoroughly into a solution of polyvinylidene chloride resin ("Saran F–220," Dow Chemical Company) in methyl ethyl ketone, in the ratio of one part to three parts of the resin (solids basis). The resulting mixture was formed into a film about 7.5 mils thick. Samples of this film were evaluated for water vapor permeability, and for water solubles on a 24-hour water soak, with the following results:

| | |
|---|---|
| Permeability constant | 103. |
| Water solubles | Less than 1%. |

For polyvinylidene chloride sheets of like thickness, but without the insolubilized carboxy methyl cellulose compound, the water vapor permeability constant was 2.3 and the water solubles on the 24-hour water soak was substantially zero.

The screen sizes referred to herein are U.S. standard sieve series.

Our copending application, Serial No. 37,554, filed June 21, 1960, describes and claims a process for imparting water vapor permeability to waterproof plastic films, and the resulting product, wherein the water sensitive material is an insolubilized starch.

We claim:

1. A waterproof plastic sheet having a thickness of between one and 15 mils and having water vapor permeability, consisting essentially of a waterproof, water-insoluble, film-forming plastic material which is normally substantially impervious to water vapor transmission and which is selected from the group consisting of polyvinyl chloride, polyethylene, polypropylene, polytetrafluoroethylene, polyvinylidene chloride, butadiene-styrene copolymers, butadiene-acrylonitrile copolymers, and natural rubber, and particles of water-insoluble carboxymethyl cellulose compound uniformly dispersed therein, said particles being present in an amount between 20% and 50% of said plastic material, by weight, and insoluble therein and providing direct contact through said particles from one face to the other of said sheet, said sheet containing a maximum of 5% of water-soluble material, said carboxymethyl cellulose compound being that obtainable by replacing at least 50% of the sodium ions of a sodium carboxymethyl cellulose having a degree of substitution of at least 0.4 by ions of the group consisting of hydrogen and insolubilizing metals, said insolubilization being such that the aforesaid range of water-soluble material is achieved.

2. A sheet in accordance with claim 1 characterized by having a thickness of 3 to 6 mils and containing said particles of 70 to 150 microns in size.

3. A sheet in accordance with claim 1 wherein said plastic material is polyvinyl chloride.

4. A sheet in accordance with claim 1 wherein said plastic material is polyethylene.

5. A sheet in accordance with claim 1 wherein said plastic material is natural rubber.

6. A sheet in accordance with claim 1 wherein said plastic material is polyvinylidene chloride.

7. A plastic sheet having a thickness of between one and 15 mils and having water vapor permeability, said sheet consisting essentially of a waterproof, water-insoluble, film-forming plastic material which is normally substantially impervious to water vapor transmission and which is selected from the group consisting of polyvinyl chloride, polyethylene, polypropylene, polytetrafluoroethylene, polyvinylidene chloride, butadiene-styrene copolymers, butadiene-acrylonitrile copolymers, and natural rubber, and uniformly dispersed therein particles extending from one face of said sheet to the other, said particles being insoluble in said plastic material and consisting essentially of water-insoluble carboxymethyl cellulose compound, said sheet having a solubility in water of not more than 5%, on a 24-hour water soak, said particles being present in an amount between 20% and 50% of said plastic material, by weight, said compound being the same as that resulting from the treatment of a sodium carboxymethyl cellulose having a degree of substitution of at least 0.4 with water-insolubilizing ions to replace the sodium ions thereof.

8. A sheet in accordance with claim 7, wherein said insolubilizing ions are hydrogen ions.

9. A sheet in accordance with claim 7, wherein said insolubilizing ions are metal ions.

10. Process of making a plastic sheet having water vapor permeability which comprises the steps of dry-mixing a carboxymethyl cellulose product obtainable by treating sodium carboxymethyl cellulose having a degree of substitution of at least 0.4 with an insolubilizing agent to replace sodium ions thereof by ions of the group consisting of hydrogen and insolubilizing metals, thereby to render the carboxymethyl cellulose product substantially insoluble in water, said product being in the form of finely divided particles, with a waterproof, water-insoluble plastic film-forming material which is normally substantially impervious to water vapor transmission and which is selected from the group consisting of polyvinyl chloride, polyethylene, polypropylene, polytetrafluoroethylene, polyvinylidene chloride, butadiene-styrene copolymers, butadiene-acrylonitrile copolymers, and natural rubber, and forming a sheet of one to 15 mils thickness with said particles interspersed uniformly and substantially continuously throughout the sheet between its faces, said particles as added to the film-forming material having a size range such as to provide direct contact through said particles from one face to the other of said sheet, said particles being present in an amount between 20% and 50% of said plastic material, by weight.

11. Process according to claim 10 wherein said particles are in sizes ranging between 50% and 150% of the thickness of said sheet.

12. Process according to claim 10 wherein said film-forming material is polyvinyl chloride.

13. Process according to claim 10 wherein said film-forming material is polyethylene.

14. Process according to claim 10 wherein said film-forming material is natural rubber.

15. Process according to claim 10 wherein said film-forming material is polyvinylidene chloride and is in the form of a solution thereof in a solvent therefor when mixed with said carboxymethyl cellulose product.

References Cited in the file of this patent

UNITED STATES PATENTS

| | | |
|---|---|---|
| 2,433,833 | Auer | Jan. 6, 1948 |
| 2,458,562 | Clark | Jan. 11, 1949 |